United States Patent
Tsai et al.

(10) Patent No.: US 10,834,613 B1
(45) Date of Patent: Nov. 10, 2020

(54) BEAM ALIGNMENT METHOD FOR ANTENNA ARRAY, MULTI BEAM TRANSMISSION SYSTEM, AND MULTI-BEAM TRANSMISSION APPARATUS

(71) Applicant: National Tsing Hua University, Hsinchu (TW)

(72) Inventors: Yuh-Ren Tsai, Hsinchu (TW); Wen-Hsiu Chen, Hsinchu (TW); Chin-Liang Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 16/828,965

(22) Filed: Mar. 25, 2020

(30) Foreign Application Priority Data

Oct. 16, 2019 (TW) .............................. 108137174 A (51) Int. Cl.
*H04W 16/28* (2009.01)
*H04W 72/04* (2009.01)
*H04W 72/08* (2009.01)
*H04W 56/00* (2009.01)
*H04W 74/00* (2009.01)

(52) U.S. Cl.
CPC ......... *H04W 16/28* (2013.01); *H04W 56/001* (2013.01); *H04W 72/044* (2013.01); *H04W 72/048* (2013.01); *H04W 72/085* (2013.01); *H04W 74/004* (2013.01)

(58) Field of Classification Search
CPC . H04W 16/28; H04W 56/001; H04W 72/044; H04W 72/048; H04W 72/085; H04W 74/00
See application file for complete search history.

(56) References Cited

U.S. PATENT DOCUMENTS

| | | | |
|---|---|---|---|
| 8,320,339 B2 | 11/2012 | Dong et al. | |
| 9,424,456 B1 * | 8/2016 | Kamath Koteshwara | ................... G06K 9/00093 |
| 10,091,662 B1 * | 10/2018 | Bendlin | ................ H04W 24/02 |
| 10,277,349 B1 * | 4/2019 | Kotecha | ............... H04J 11/0086 |
| 10,334,547 B2 * | 6/2019 | Huang | .................. H04W 24/10 |

(Continued)

FOREIGN PATENT DOCUMENTS

WO    2018002154    1/2018

*Primary Examiner* — Dominic E Rego
(74) *Attorney, Agent, or Firm* — JCIPRNET (57) ABSTRACT

A beam alignment method for an antenna array is provided. In the method, a base station uses multi-modal beam patterns for transmitting several synchronization signals. User equipment scans the synchronization signals, determines a synchronization signal with the strongest received power and a receive beam direction corresponding thereto, and transmits an initial access message including index information indicating the strongest synchronization signal. The base station receives the initial access message on the random access channel by using the single-modal beam patterns, determines a single-modal beam pattern with the strongest access power for the initial access message, and compares the determined single-modal beam pattern with the strongest access power with a main lobe of the multi-modal beam pattern corresponding to the index information indicating the synchronization signal with the strongest received power in the initial access message, to determine an optimal beam direction for the transmission to the user equipment.

7 Claims, 9 Drawing Sheets

(56) References Cited

U.S. PATENT DOCUMENTS

| | | | |
|---|---|---|---|
| 10,440,671 B2* | 10/2019 | Yamada | H04W 16/32 |
| 10,455,608 B2* | 10/2019 | Shepard | H04W 68/02 |
| 10,499,435 B2* | 12/2019 | Sahlin | H04W 74/0866 |
| 10,517,061 B1* | 12/2019 | Kumar | H04B 7/088 |
| 10,736,054 B2* | 8/2020 | Jiang | H04W 52/36 |
| 2002/0177468 A1* | 11/2002 | Takeuchi | H04W 16/28 |
| | | | 455/562.1 |
| 2004/0082349 A1* | 4/2004 | Pinault | H04W 56/001 |
| | | | 455/502 |
| 2005/0053123 A1* | 3/2005 | Higuchi | H04B 7/088 |
| | | | 375/148 |
| 2011/0305162 A1* | 12/2011 | Morioka | H04W 16/28 |
| | | | 370/252 |
| 2013/0331140 A1* | 12/2013 | Halbauer | H04W 72/042 |
| | | | 455/509 |
| 2014/0073337 A1 | 3/2014 | Hong et al. | |
| 2014/0348138 A1* | 11/2014 | Ono | H04W 56/001 |
| | | | 370/336 |
| 2015/0131750 A1 | 5/2015 | Xue et al. | |
| 2015/0312851 A1* | 10/2015 | Ode | H04W 56/001 |
| | | | 370/252 |
| 2016/0087743 A1* | 3/2016 | El Ayach | H04W 56/001 |
| | | | 455/452.1 |
| 2016/0277225 A1 | 9/2016 | Frenne et al. | |
| 2016/0302115 A1* | 10/2016 | Parkvall | H04W 24/04 |
| 2017/0332407 A1* | 11/2017 | Islam | H04W 52/367 |
| 2018/0192419 A1* | 7/2018 | Yi | H04L 5/14 |
| 2018/0279286 A1* | 9/2018 | Akoum | H04W 72/046 |
| 2018/0288737 A1* | 10/2018 | Islam | H04L 5/0023 |
| 2019/0053071 A1* | 2/2019 | Ly | H04B 7/0617 |
| 2019/0116564 A1* | 4/2019 | strom | H04L 27/2636 |
| 2019/0132066 A1* | 5/2019 | Park | H04W 36/0079 |
| 2019/0182785 A1* | 6/2019 | da Silva | H04W 56/00 |
| 2019/0182786 A1* | 6/2019 | Wang | H04B 7/0695 |
| 2019/0306888 A1* | 10/2019 | Takeda | H04W 72/046 |
| 2020/0059874 A1* | 2/2020 | Noh | H04L 5/0007 |
| 2020/0100290 A1* | 3/2020 | Mundarath | H04W 16/28 |
| 2020/0221530 A1* | 7/2020 | Lee | H04W 76/27 |
| 2020/0267579 A1* | 8/2020 | Akoum | H04W 36/0077 |
| 2020/0275402 A1* | 8/2020 | Shi | H04W 16/28 |

* cited by examiner

BEAM ALIGNMENT METHOD FOR ANTENNA ARRAY, MULTI BEAM TRANSMISSION SYSTEM, AND MULTI-BEAM TRANSMISSION APPARATUS

CROSS-REFERENCE TO RELATED APPLICATION

This application claims the priority benefit of Taiwan application no. 108137174, filed on Oct. 16, 2019. The entirety of the above-mentioned patent application is hereby incorporated by reference herein and made a part of this specification.

BACKGROUND OF THE INVENTION

1. Field of the Invention

The invention relates to a beam transmission method and a beam transmission system, and in particular to, a beam alignment method for an antenna array, a multi-beam transmission system, and a multi-beam transmission apparatus.

2. Description of Related Art

In order to overcome the serious propagation loss problem in a millimeter-wave (mm-wave) frequency band, both a transmit end and a receive end usually use directional beamforming to improve the transmission efficiency. However, in a mobile communication environment, an initial access stage has not obtained information of an efficient beam direction, and therefore how to find an efficient beam direction (also referred to as beam alignment (BA)) is a key technology to establish an effective link in the initial access stage.

Conventional beam alignment may be achieved through regular sequential search, but this manner is extremely inefficient and results in a larger search delay. For example, assuming that the transmit end and the receive end respectively have $N_T$ beams and $N_R$ beams, there are $N_T \times N_R$ possible beam pairings in total; the transmit end must determine an optimal beam of the $N_T$ beams, and the receive end must also determine an optimal beam of the $N_R$ beams.

Considering the fifth generation (5G) new radio (NR) standard, a base station (BS) transmits multiple synchronization signals (SSs) on a physical broadcast channel (PBC), each synchronization signal is related to a specific beam pattern, and a transmission beam direction of the synchronization signal is set for beam alignment of a user equipment (UE).

In the initial access stage, the user equipment measures all the synchronization signals transmitted by the base station, to obtain information about the beam alignment. When all the synchronization signals are received and measured, the user equipment needs to determine a synchronization signal with the strongest received power and a receive beam direction corresponding thereto; after that, the user equipment transmits a random access preamble for initial access in a radio resource block (RB) assigned by the strongest synchronization signal. The base station may confirm, using the received random access preamble, the strongest synchronization signal observed by the user equipment; therefore, the base station may determine an optimal transmission beam direction corresponding to the user equipment, that is, the beam alignment procedure of both sides has been completed.

Traditionally, each synchronization signal is relative to a single beam direction; for example, a discrete Fourier transform (DFT) basis vector is used as a beamforming vector, which is related to a single-direction beam pattern. In addition, the number of synchronization signals that may be used by the base station in the physical broadcast channel is usually limited. For example, an upper limit of the number of synchronization signals in the current 5G NR standard is 64, and the resolution in angular domain depends on the number of synchronization signals. If the number of synchronization signals used by the base station in the physical broadcast channel is N, a single panel antenna is divided into N beam directions in the angular domain contained, and the N synchronization signals are represented as $SS_n$, n=0, 1, ..., N-1.

Figure 1:
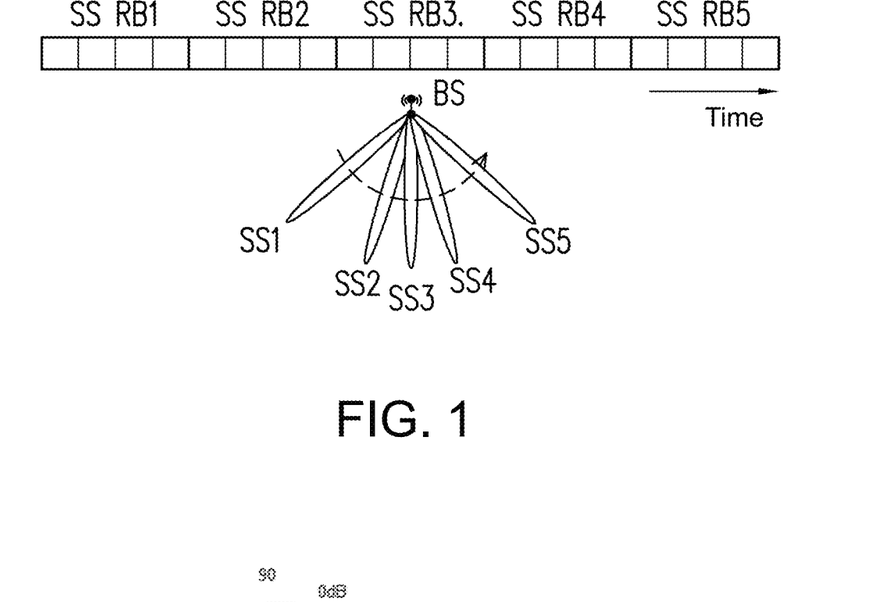
FIG. 1 shows a beam sweep method for a conventional transmission/reception point.

FIG. 1 illustrates a beam sweep method of a conventional transmission/reception point (TRxP). Referring to FIG. 1, the transmission/reception point BS is, for example, a conventional base station, which uses a beam sweeping method to sequentially transmit synchronization signals SS1-SS5 in the form of a single beam according to the beam direction shown in FIG. 1. Each synchronization signal uses one of resource blocks SS RB1-SS RB5, so that a user equipment receiving the synchronization signals can learn strength of a transmission beam of each synchronization signal by decoding signals of the resource blocks SS RB1-SS RB5, and transmit back index information, indicating the strongest synchronization signal, to the transmission/reception point BS for the transmission/reception point to determine and complete the beam alignment procedure accordingly.

In order to enhance the resolution of the beam in the angular domain, the physical broadcast channel should increase the number of synchronization signals for use. However, the search time and consumption of radio resources will increase, resulting in an increase in the time delay at the initial access stage.

SUMMARY OF THE INVENTION

The invention provides a beam alignment method for an antenna array, a multi-beam transmission system, and a multi-beam transmission apparatus, which can improve beam alignment efficiency and benefit in an initial access stage.

The invention provides a beam alignment method for an antenna array, which is adapted to a multi-beam transmission system including a base station and a user equipment. The method includes the following steps: using, by a base station, a plurality of multi-modal beam patterns as beam patterns for transmitting several synchronization signals, where a single multi-modal beam pattern includes a plurality of main lobes that can distinguish directions, and directions of main lobes between different multi-modal beam patterns do not overlap; scanning, by a user equipment, the synchronization signals, determining a synchronization signal with the strongest received power and a receive beam direction corresponding thereto, and transmitting an initial access message through a random access channel, the initial access message including index information (explicitly or implicitly) indicating the synchronization signal with the strongest received power; receiving, by the base station, the initial access message on the random access channel by using a plurality of single-modal beam patterns, where coverage of the main lobe of each single-modal beam pattern includes only at most one of the main lobes of each multi-modal beam pattern; determining, by the base station, a receiving single-modal beam pattern with the strongest access power for the initial access message, and comparing the determined single-modal beam pattern having the strongest access power with a main lobe of the multi-modal beam pattern corresponding to the index information indicating the synchronization signal having the strongest received power in the initial access message, to determine an optimal beam direction for the transmission to the user equipment.

In an embodiment of the invention, the plurality of multi-modal beam patterns used by the base station may be combined, by using a plurality of single-modal beam patterns based on the discrete Fourier transform basis, into a multi-modal beam pattern of a multi-modal beam having a plurality of directions, where each of the single-modal beamforming vectors is multiplied by a predetermined phase and then added, and the phase of each element in the added beamforming vector is extracted with a fixed amplitude, to obtain a multi-modal beam pattern.

The invention provides a multi-beam transmission system, including a base station and a user equipment. The base station uses a plurality of multi-modal beam patterns as beam patterns for transmitting several synchronization signals, where the multi-modal beam patterns include a plurality of main lobes that can distinguish directions, and directions of the main lobes between different multi-modal beam patterns do not overlap. The user equipment scans the synchronization signals, determines a synchronization signal with the strongest received power and a receive beam direction corresponding thereto, and transmits, through a random access channel, an initial access message including index information indicating the synchronization signal with the strongest received power. The base station receives the initial access message by using a plurality of single-modal beam patterns on the random access channel, where coverage of the main lobe of each single-modal beam pattern includes only at most one of the main lobes of each multi-modal bean pattern, and the base station determines a receiving single-modal beam pattern with the strongest access power for the initial access message, and compares the determined single-modal beam pattern having the strongest access power with a main lobe of the multi-modal beam pattern corresponding to the index information indicating the synchronization signal having the strongest received power in the initial access message, to determine an optimal beam direction for the transmission to the user equipment.

In an embodiment of the invention, there is a spacing in the angular domain that can be used to distinguish different main lobes in a multi-modal beam pattern; and each main lobe of a multi-modal beam pattern has a beam direction the same as the beam direction of one of a plurality of high-resolution single-modal beam patterns.

In an embodiment of the invention, the base station generates the multi-modal beam pattern by using a uniform linear array (ULA) antenna or a uniform planar array (UPA) antenna.

The invention provides a multi-beam transmission/receiving apparatus, including an array antenna, a transceiver, and a processor. The transceiver is coupled to the array antenna, and generates, by using the array antenna, beams of a plurality of multi-modal beam patterns and a plurality of single-modal beam patterns, where the multi-modal beam patterns include a plurality of main lobes that can distinguish directions, and directions of the main lobes between different multi-model beam patterns do not overlap. The processor is coupled to the transceiver for controlling the transceiver to use the multi-model beam patterns as beam patterns for transmitting several synchronization signals to a user equipment, where the user equipment scans the synchronization signals, determines a synchronization signal with the strongest received power and a receive beam direction corresponding thereto, and transmits, through a random access channel, an initial access message including index information indicating the synchronization signal with the strongest received power. In addition, the processor controls the transceiver to receive, by using a single-modal beam pattern on the random access channel, an initial access message transmitted by the user equipment, where coverage of the main lobe of each single-modal beam pattern includes only at most one of the main lobes of each multi-modal beam patterns. Moreover, the processor determines a single-modal beam pattern with the strongest access power for the initial access message, and compares the determined single-modal beam pattern having the strongest access power with a main lobe of the multi-modal beam pattern corresponding to the index information indicating the synchronization signal having the strongest received power in the initial access message, to determine an optimal beam direction for the transmission to the user equipment.

In an embodiment of the invention, the array antenna includes a ULA antenna or a UPA antenna.

To make the features and advantages of the invention clear and easy to understand, the following gives a detailed description of embodiments with reference to accompanying drawings.

DESCRIPTION OF THE EMBODIMENTS

Embodiments of the invention propose a technology for transmitting a synchronization signal using a multi-modal beam pattern to improve beam alignment efficiency and benefits in an initial access stage. Assuming that angular domain resolution required by a base station is N, the resolution is cut by a set of N orthogonal beams $O=\{B_n^{(O)}$

|n=0, 1, ..., N−1} within an angular range (−π/2, π/2), and the corresponding beam directions thereof are represented as D={$D_0, D_1, \ldots, D_{N-1}$}. For example, FIG. 1 shows all orthogonal beam patterns and corresponding beam directions thereof when N=16, and beam alignment means to confirm an optimal beam direction for a user equipment.

Different from the traditional designs in which a set of single-modal beam patterns (such as a set of orthogonal beam patterns) is used to transmit synchronization signals, in this patent, a set of K-modal beam patterns is used to transmit synchronization signals. A K-modal beam pattern has K main lobes within an angular range of (−π/2, π/2), where a beam direction corresponding to each main lobe is consistent with a beam direction of one of the original N orthogonal beams with only a small error. In order to cover the original complete N angular domain directions, there are M=N/K different K-modal beam patterns in total, which are represented as $B_m^{(S)}$, m=0, 1, . . . , M−1, which are respectively used as beam patterns for the transmission of M synchronization signals. For example, FIG. 2 shows M=4 different K-modal beam patterns used when N=16 and K=4, which are respectively relative to M=4 synchronization signals $SS_m$, where m=0, 1, 2, 3.

A manner in which the multi-modal beam pattern is generated in the embodiment of the invention is described below.

Figure 2A:
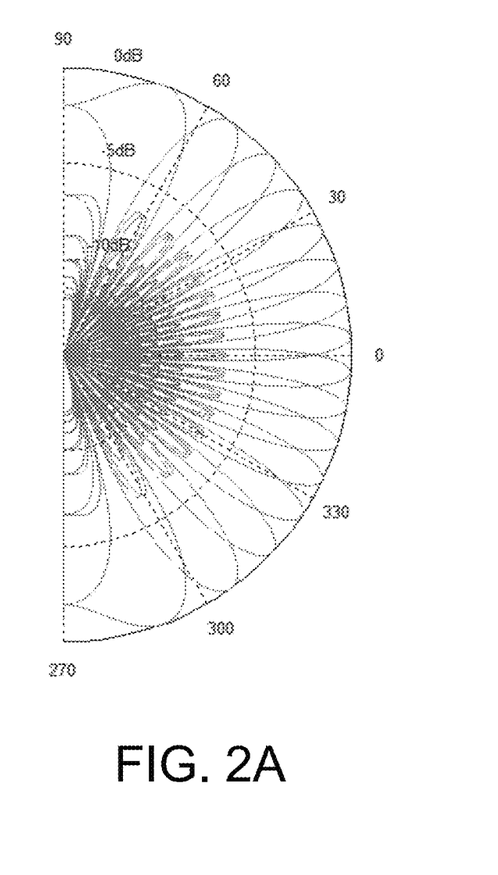
FIG. 2A shows all DFT basis based orthogonal beam patterns when N=16.
Figure 2B:
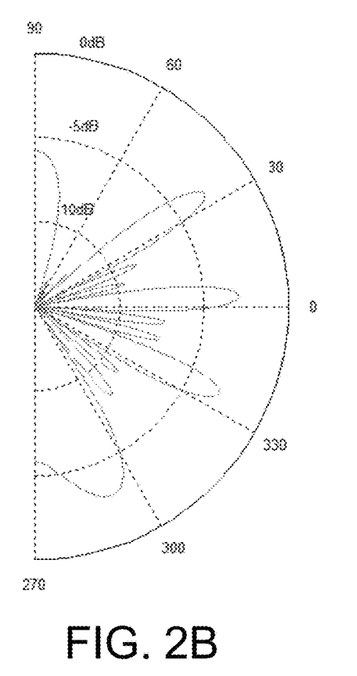
FIG. 2B to FIG. 2E show an example of M=4 different K-modal beam patterns used when N=16 and K=4.
Figure 2C:
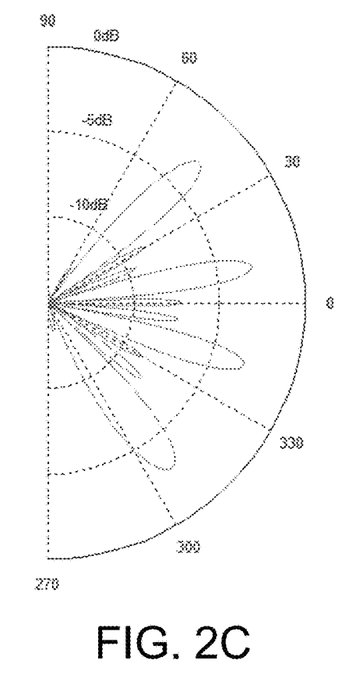
Figure 2D:
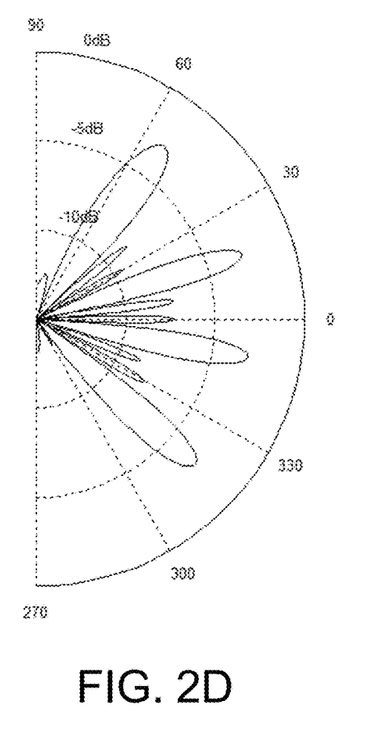
Figure 2E:
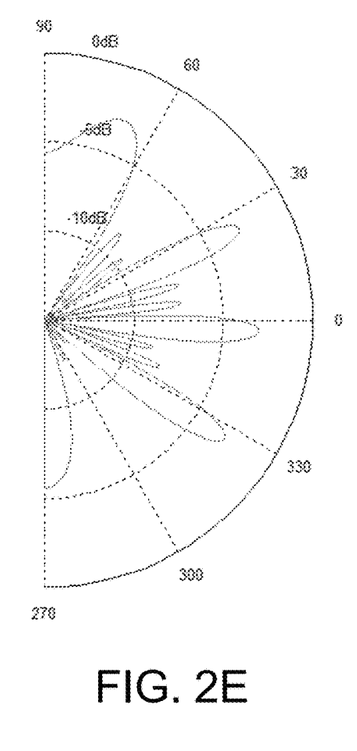

First, a discrete Fourier transform (DFT) matrix U is defined, of which a mathematical form is:

$$U = \left[a\left(\frac{-(N-1)}{N}\right) a\left(\frac{-(N-3)}{N}\right) \ldots a\left(\frac{N-1}{N}\right)\right],$$

where $$a(\theta) = \frac{1}{\sqrt{N}}[1, e^{j\pi\theta}, \ldots, e^{j\pi(N-1)\theta}]^T,$$

where
θ represents a corresponding direction, and N represents the number of beams. Therefore, each column vector in the matrix U represents a beamforming vector in different directions. Assuming that N=16, there are sixteen orthogonal beams in sixteen directions within the angular range of (−π/2, π/2), as shown in FIG. 2A.

Then, a plurality of orthogonal beamforming vectors is used to form a multi-modal beamforming vector having a plurality of directions. If that N=16 is used as an example, and the original beam directions are numbered from 1 to 16 counter-clockwise, the beam directions may be divided into four sets, respectively {1, 5, 9, 13}, {2, 6, 10, 14}, {3, 7, 11, 15}, and {4, 8, 12, 16}, each of which corresponds to a 4-modal beam pattern.

The most intuitive method is adding four orthogonal beamforming vectors directly, but the constant amplitude constraint of a beamforming vector may not be complied. In other words, it is required that each element in a beamforming vector must have a constant amplitude for an array antenna.

In order to comply with the constraint of constant amplitude, in the embodiment of the invention, the orthogonal beamforming vector is multiplied by a phase before being added, and the phase of each element of the resultant vector after addition is extracted and multiplied by a constant amplitude to form a multi-modal beamforming vector. If the 4-modal beam pattern {1, 5, 9, 13} is used as an example, a mathematical form thereof is:

$$a^{combine}(\emptyset_1,\emptyset_2,\emptyset_3)=e^{j\emptyset_1}a(\theta_1)+e^{j\emptyset_2}a(\theta_5)+e^{j\emptyset_3}a(\theta_9)+a(\theta_{13}),$$

where $0<\emptyset_i<2\pi$, i=1, 2, 3.

Next, a phase thereof is used:

$$V^{phase}(\emptyset_1, \emptyset_2, \emptyset_3) = \frac{1}{\sqrt{N}} e^{j \angle a^{combine}(\emptyset_1, \emptyset_2, \emptyset_3)}$$

Figure 3:
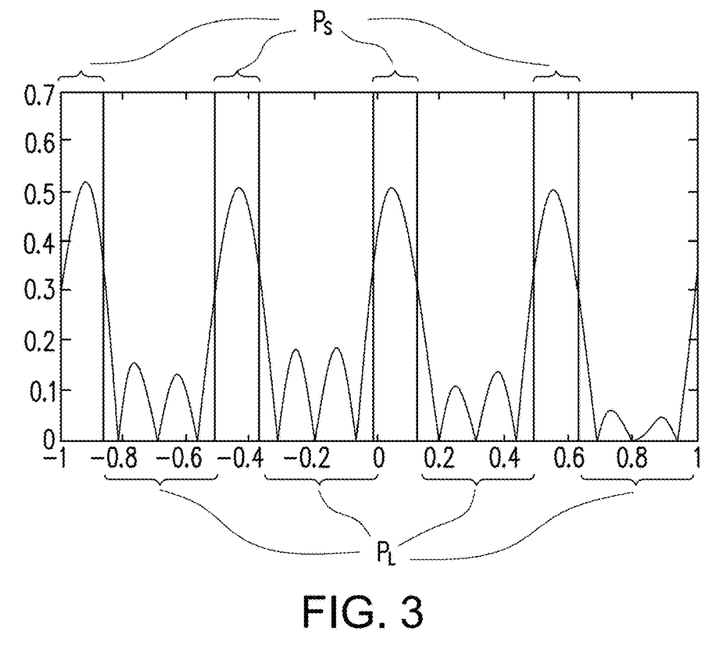
FIG. 3 is a schematic diagram of a main lobe range power $P_S$ and a main lobe out-of-range power $P_L$ on a beam pattern.

In the embodiment of the invention, two metrics are used as the search criteria of {$\emptyset_1, \emptyset_2, \emptyset_3$}. The first is the beam to leakage ratio (BLR), which refers to the ratio of the average power within a desired range of the multi-modal beam pattern to the average power outside the desired range, and a mathematical formula of the beam to leakage ratio $\bar{\omega}$ is defined as follows:

$$\bar{\omega} = \frac{P_S}{P_L},$$

where
$P_S$ and $P_L$ represent the average power within the desired main lobe range and the average power outside the desired main lobe range in the multi-modal beam pattern, with the mathematical formula thereof as follows:

$$P_S = \frac{1}{\Delta_S} \int_{\theta \in \Theta_S} v^H a(\theta) a^H(\theta) v d\theta$$

$$P_L = \frac{1}{2-\Delta_S} \int_{\theta \in \Theta \setminus \Theta_s} v^H a(\theta) a^H(\theta) v d\theta,$$

where
$\Delta_S$ is the width of $P_S$, and a schematic diagram of $P_S$ and $P_L$ on the multi-modal beam pattern is shown in FIG. 3.

The second search criterion is to ensure that the variation of gain of the multi-modal beam pattern within the desired main lobe range should not be too large; so ζ is defined as variance of the average power within the desired main lobe range, and the mathematical formula is:

$$\zeta = \frac{1}{\Delta_S} \int_{\theta \in \Theta_S} [v^H a(\theta) a^H(\theta) v - P_S]^2 d\theta.$$

With the foregoing two metrics, in the embodiment of the invention, an optimization problem of the multi-modal beam pattern design may be expressed as:

$$v^* = \underset{V}{\operatorname{argmax}} \bar{\omega} = \frac{P_S}{P_L}, \zeta < \tau,$$

v* is the designed multi-modal beamforming vector and τ is a threshold value.

Using N=16 as an example, the set of phases obtained through the optimization problem is {$\emptyset_1$=0.6283, $\emptyset_2$=3.1416, $\emptyset_3$=0.6283}, and the M=4 different 4-modal beam patterns are obtained through using the set of phases, as shown in FIG. 2B to FIG. 2E.

Figure 4A:
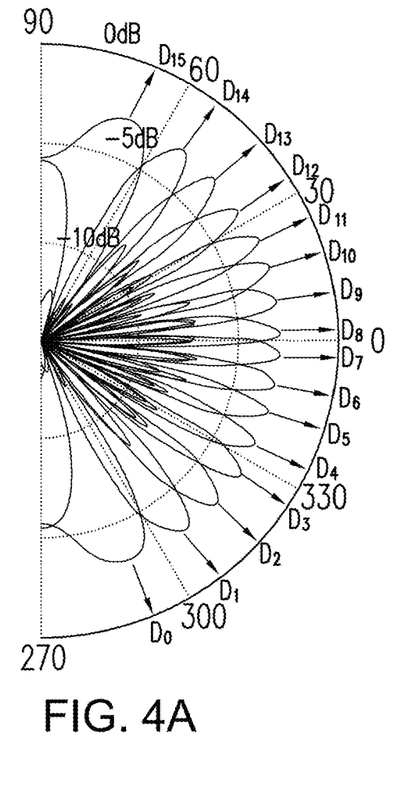
FIG. 4A shows all orthogonal beam patterns and beam directions corresponding thereof when N=16.
Figure 4B:
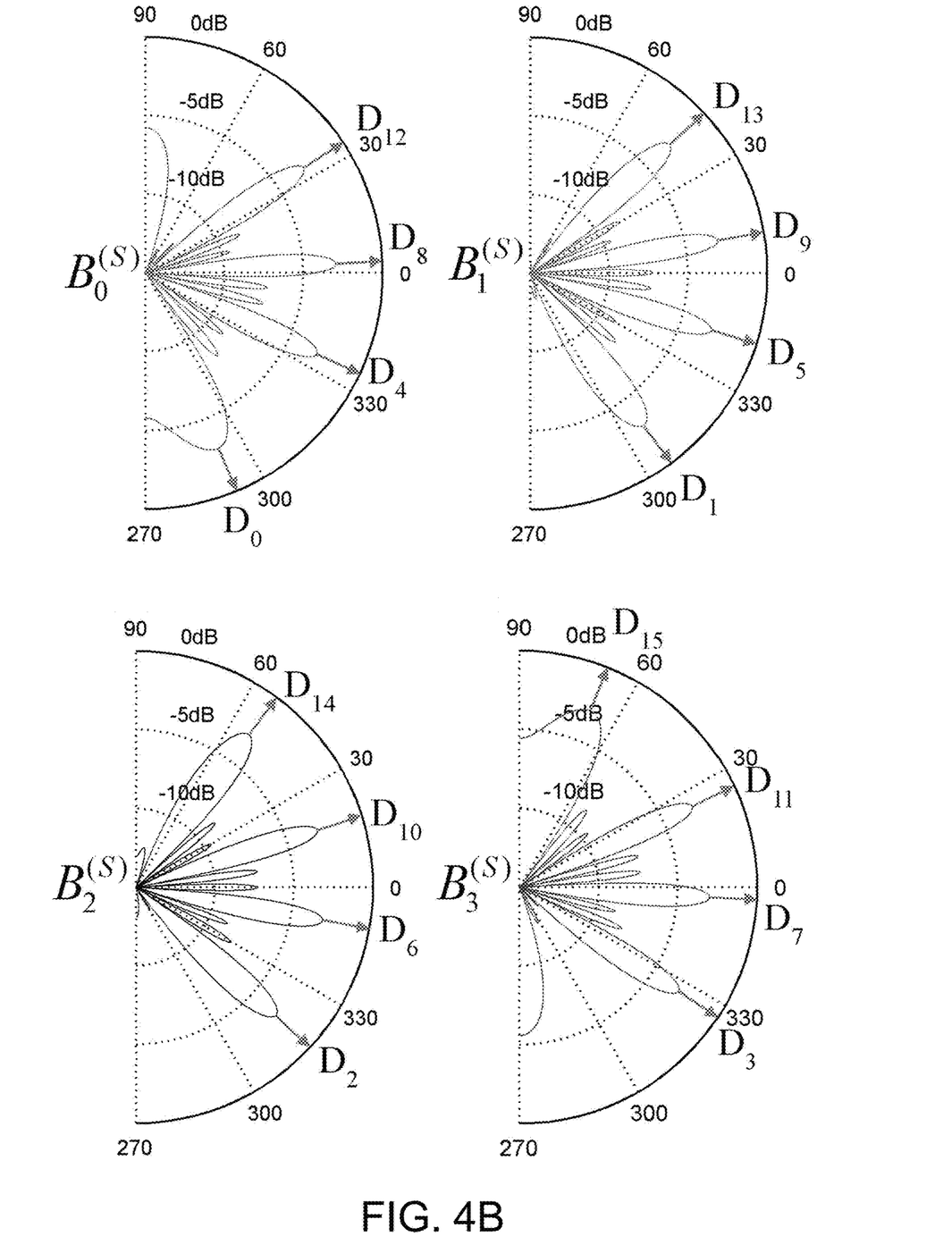
FIG. 4B shows M=4 K-modal beam patterns used and beam directions corresponding thereof when N=16 and K=4.
Figure 5:
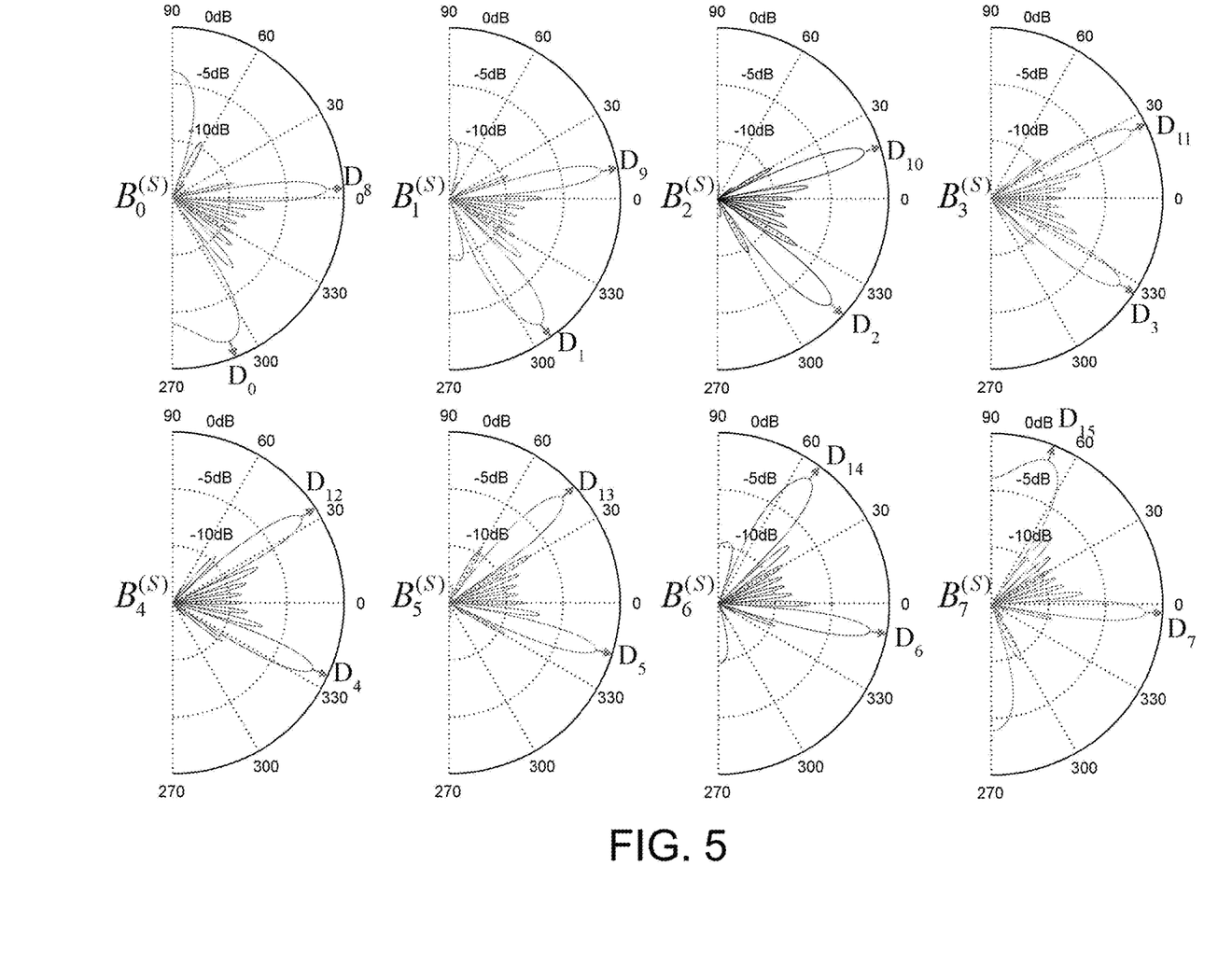
FIG. 5 shows M=8 K-modal beam patterns used and beam directions corresponding thereof when N=16 and K=2.

In order to effectively distinguish the K modal corresponding directions in a multi-modal beam pattern $B_m^{(S)}$, K main lobes are, for example, approximately equidistantly scattered, and are oriented relative to the original orthogonal beams $B_n^{(O)}$, n=m, m+M, . . . , m+(K−1) M, a total of K orthogonal beams; that is, the beam pattern $B_m^{(S)}$ includes the beam directions in the following set: $D_m^{(S)}=\{D_m, D_{m+M}, \ldots, D_{m+(K-1)M}\}$. For example, FIG. 4A shows all the N orthogonal beam patterns and beam directions $D_0$-$D_{15}$ corresponding thereof when N=16. FIG. 4B shows M=4 K-modal beam patterns used when N=16 and K=4, where the set of beam directions included in the beam pattern $B_2^{(S)}$ is $D_2^{(S)}=\{D_2, D_6, D_{10}, D_{14}\}$. FIG. 5 shows M=8 K-modal beam patterns used when N=16 and K=2, where the set of beam directions included in the beam pattern $B_2^{(S)}$ is $D_2^{(S)}=\{D_2, D_{10}\}$.

Table I below provides the sets of beam directions of the K-modal beam pattern designed for four different scenarios.

TABLE I

| Parameter | Number of synchronization signals | Sets of beam directions of main lobes |
|---|---|---|
| N = 16, K = 4 | M = 4 | $D_0^{(S)} = \{D_0, D_4, D_8, D_{12}\}$, $D_1^{(S)} = \{D_1, D_5, D_9, D_{13}\}$, $D_2^{(S)} = \{D_2, D_6, D_{10}, D_{14}\}$, $D_3^{(S)} = \{D_3, D_7, D_{11}, D_{15}\}$ |
| N = 16, K = 2 | M = 8 | $D_0^{(S)} = \{D_0, D_8\}$, $D_1^{(S)} = \{D_1, D_9\}$, $D_2^{(S)} = \{D_2, D_{10}\}$, $D_3^{(S)} = \{D_3, D_{11}\}$, $D_4^{(S)} = \{D_4, D_{12}\}$, $D_5^{(S)} = \{D_5, D_{13}\}$, $D_6^{(S)} = \{D_6, D_{14}\}$, $D_7^{(S)} = \{D_7, D_{15}\}$ |
| N = 64, K = 8 | M = 8 | $D_0^{(S)} = \{D_0, D_8, D_{16}, D_{24}, D_{32}, D_{40}, D_{48}, D_{56}\}$, $D_1^{(S)} = \{D_1, D_9, D_{17}, D_{25}, D_{33}, D_{41}, D_{49}, D_{57}\}$, $D_2^{(S)} = \{D_2, D_{10}, D_{18}, D_{26}, D_{34}, D_{42}, D_{50}, D_{58}\}$, $D_3^{(S)} = \{D_3, D_{11}, D_{19}, D_{27}, D_{35}, D_{43}, D_{51}, D_{59}\}$, $D_4^{(S)} = \{D_4, D_{12}, D_{20}, D_{28}, D_{36}, D_{44}, D_{52}, D_{60}\}$, $D_5^{(S)} = \{D_5, D_{13}, D_{21}, D_{29}, D_{37}, D_{45}, D_{53}, D_{61}\}$, $D_6^{(S)} = \{D_6, D_{14}, D_{22}, D_{30}, D_{38}, D_{46}, D_{54}, D_{62}\}$, $D_7^{(S)} = \{D_7, D_{15}, D_{23}, D_{31}, D_{39}, D_{47}, D_{55}, D_{63}\}$ |
| N = 64, K = 4 | M = 16 | $D_0^{(S)} = \{D_0, D_{16}, D_{32}, D_{48}\}$, $D_1^{(S)} = \{D_1, D_{17}, D_{33}, D_{49}\}$, $D_2^{(S)} = \{D_2, D_{18}, D_{34}, D_{50}\}$, $D_3^{(S)} = \{D_3, D_{19}, D_{35}, D_{51}\}$, $D_4^{(S)} = \{D_4, D_{20}, D_{36}, D_{52}\}$, $D_5^{(S)} = \{D_5, D_{21}, D_{37}, D_{53}\}$, $D_6^{(S)} = \{D_6, D_{22}, D_{38}, D_{54}\}$, $D_7^{(S)} = \{D_7, D_{23}, D_{39}, D_{55}\}$, $D_8^{(S)} = \{D_8, D_{24}, D_{40}, D_{56}\}$, $D_9^{(S)} = \{D_9, D_{25}, D_{41}, D_{57}\}$, $D_{10}^{(S)} = \{D_{10}, D_{26}, D_{42}, D_{58}\}$, $D_{11}^{(S)} = \{D_{11}, D_{27}, D_{43}, D_{59}\}$, $D_{12}^{(S)} = \{D_{12}, D_{28}, D_{44}, D_{60}\}$, $D_{13}^{(S)} = \{D_{13}, D_{29}, D_{45}, D_{61}\}$, $D_{14}^{(S)} = \{D_{14}, D_{30}, D_{46}, D_{62}\}$, $D_{15}^{(S)} = \{D_{15}, D_{31}, D_{47}, D_{63}\}$ |

In an initial access procedure, a user equipment scans all synchronization signals transmitted by a base station, and measures the average received power of each synchronization signal for comparison. In addition, the user equipment confirms that the synchronization signal with the strongest average received power and the receive beam and corresponding direction thereof is received. Assuming that $SS_\eta$ is the synchronization signal that has the strongest average received power and that is measured by the user equipment, the user equipment transmits an initial access message to the base station via a random access channel, which includes an index η of the synchronization signal with the strongest average received power, regardless of whether the index is transmitted in an explicit or implicit transmission manner. The base station cannot exclusively determine an optimal beam transmission direction in the beam directions $D_0$-$D_{15}$ simply via the index η of the synchronization signal.

It is assumed that the base station receives the initial access message transmitted by the user equipment by using Q different single-modal beam patterns (for example, a beam pattern based on a discrete Fourier transform (DFT) basis) on a random access channel. The random access beam pattern is expressed as $B_q^{(R)}$, q=0, 1, . . . , Q−1, and resolution Q of the random access beam pattern is smaller than original desired angular domain resolution N, that is, Q<N. Each random access beam pattern covers a range of consecutive N/Q orthogonal beams in O in the angular domain; that is, the random access receive beam pattern $B_q^{(R)}$ covers the beam directions in the following set $D_q^{(R)}=\{D_{qN/Q}, D_{qN/Q+1}, \ldots, D_{(q+1)N/Q-1}\}$.

Figure 6A:
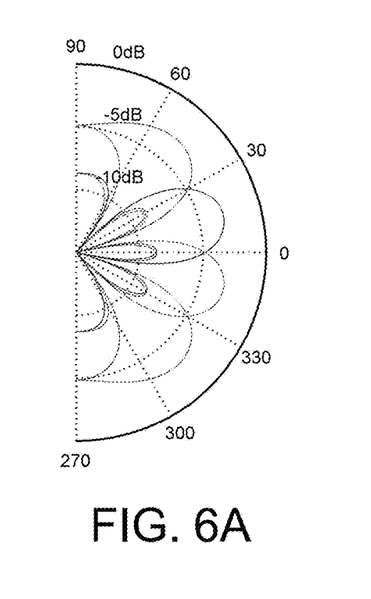
FIG. 6A shows an example of Q=4 different random access single-modal beam patterns used when N=16 and Q=4.
Figure 6B:
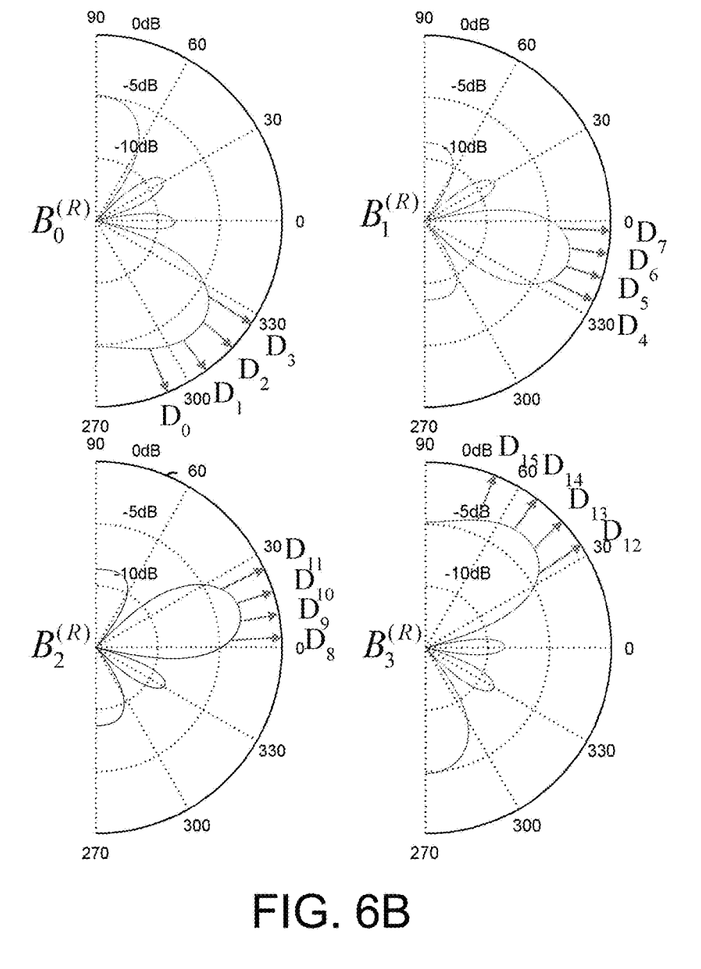
FIG. 6B shows the beam directions included in each beam pattern.

For example, FIG. 6A shows a random access single-modal beam pattern used when N=16 and Q=4, and FIG. 6B shows a beam direction included in each beam pattern $B_q^{(R)}$. For example, a beam direction included in the beam pattern $B_1^{(R)}$ is $D_1^{(R)}$ $\{D_4, D_5, D_6, D_7\}$. Further assuming that Q≥K, within the coverage of a single random access receive beam pattern $B_q^{(R)}$, for any K-modal synchronization signal beam pattern $B_m^{(S)}$, only one main lobe direction of $B_m^{(S)}$ is included in maximum.

For example, according to FIG. 4B and FIG. 6B, the beam pattern $B_1^{(R)}$ includes only one main lobe direction $D_4$ of the synchronization signal beam pattern $B_0^{(S)}$, one main lobe direction $D_5$ of the synchronization signal beam pattern $B_1^{(S)}$, one main lobe direction $D_6$ of the synchronization signal beam pattern $B_2^{(S)}$, and one main lobe direction $D_7$ of the synchronization signal beam pattern $B_3^{(S)}$.

Assuming that the initial access message of the user equipment has the strongest received power in the random access beam pattern $B_\xi^{(R)}$, the base station may exclusively determine the optimal beam direction transmitted to the user equipment by an intersection set of the two sets $D_\eta^{(S)}$ and $D_\xi^{(R)}$, and the intersection set $D_\eta^{(S)} \cap D_\xi^{(R)}$ has only one element.

An architecture of a multi-beam transmission system of the embodiment of the invention is described below.

Figure 7A:
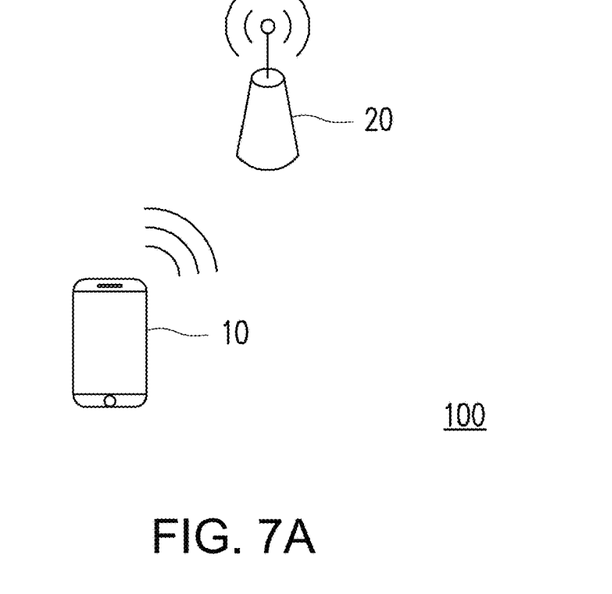
FIG. 7A and FIG. 7B are schematic diagrams of a multi-beam transmission system according to an embodiment of the invention.
Figure 7B:
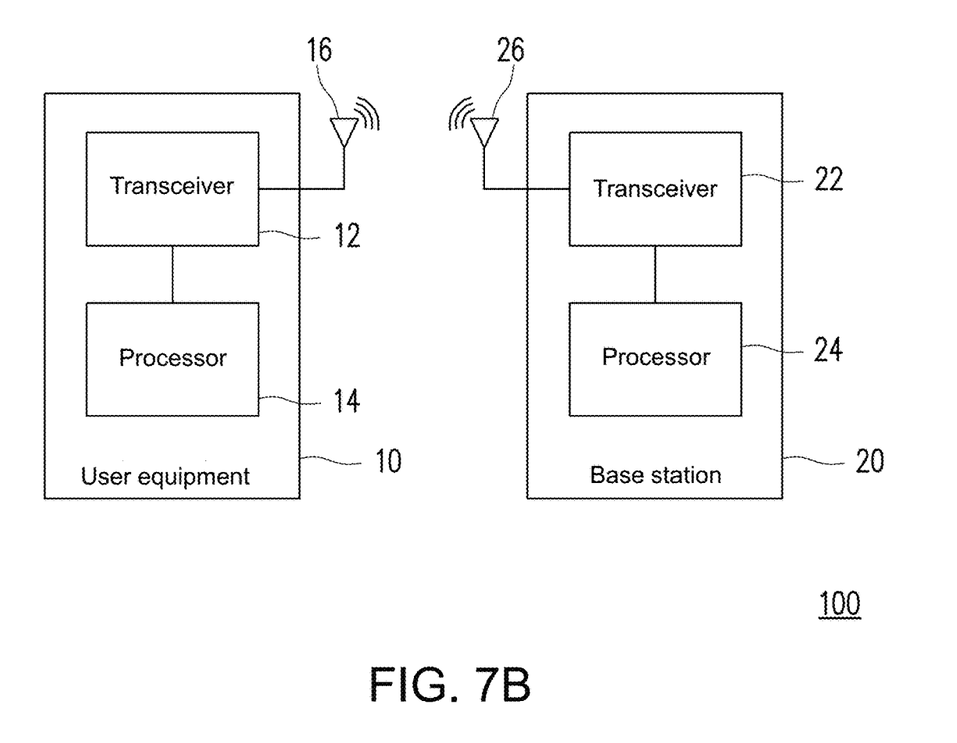

FIG. 7A and FIG. 7B are schematic diagrams of a multi-beam transmission system according to an embodiment of the invention. First referring to FIG. 7A, a multi-beam transmission system 100 is, for example, a 5G wireless communication system such as an orthogonal frequency division multiplexing communication system, including user equipment 10 and a base station 20. The user equipment 10 may be a fixed or mobile communication device supporting a 5G new radio (NR), for example, a mobile station, a server, a personal computer, a tablet PC, a mobile phone, a personal digital assistant, and the like. The base station 20 may be a cellular network node, such as a next generation Node B (gNodeB or gNB).

Referring to FIG. 7B, the user equipment 10 includes at least a transceiver 12, a processor 14, and an antenna 16. The transceiver 12 is, for example, disposed in the user equipment 10 for transmitting wireless signals to the base station transceiver 22 and receiving wireless signals from the base station transceiver 22 via the antenna 16. The antenna 16 is, for example, a uniform linear array (ULA) antenna, or a uniform planar array (UPA) antenna, or other types of antennas. The processor 14 is, for example, a programmable computing apparatus, such as a microprocessor, a microcontroller, a central processing unit (CPU), a digital signal processor (DSP), a field programmable gate array (FPGA), an application-specific integrated circuit (ASIC), etc., and is configured to control the operation of the user equipment 10.

The base station 20 also includes at least a transceiver 22, a processor 24, and an antenna 26. The transceiver 22 is, for example, configured to transmit wireless signals to the user equipment transceiver 12 and to receive wireless signals from the user equipment transceiver 12 via the antenna 26. The antenna 26 is, for example, a ULA antenna, or a UPA antenna, or other types of antennas, which may be used to generate the beam of the foregoing multi-modal beam pattern. In an embodiment, the base station 20 may further include, but is not limited to, an amplifier, a mixer, an oscillator, an analog-to-digital converter (ADC), and a digital-to-analog converter (DAC), a filter, or other hardware elements, to perform operations such as low noise amplification, impedance matching, frequency mixing, up-conversion or down-conversion, filtering, and the like. The processor 24 is a programmable computing apparatus, such as a microprocessor, a microcontroller, a CPU, a DSP, an FPGA, an ASIC, etc., and is configured to control the operation of the base station 20.

Figure 8:
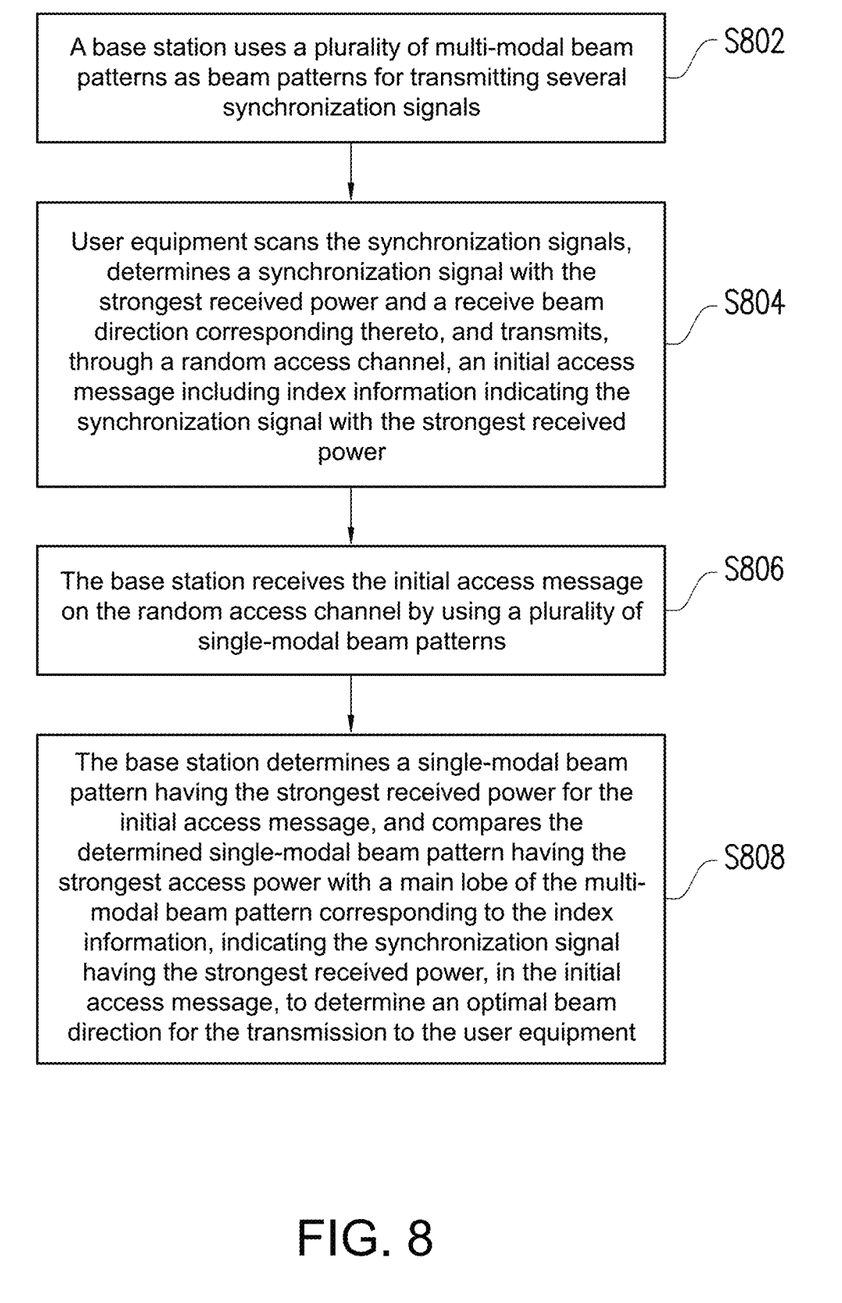
FIG. 8 is a flowchart of a beam alignment method based on multi-modal beam patterns according to an embodiment of the invention.

FIG. 8 is a flowchart of a beam alignment method based on a multi-modal beam pattern according to an embodiment of the invention. Referring to FIG. 8, the method of the embodiment of the invention is applicable to user equipment 10 and a base station 20 as described in the previous embodiments. Detailed steps of the method are described below with reference to different elements in the user equipment 10 and the base station 20 of FIG. 7B.

First, in step S802, a processor 24 of the base station 20 controls a transceiver 22 to use a plurality of multi-modal beam patterns as an antenna 26 for transmitting beam patterns of synchronization signals. The multi-modal beam patterns include a plurality of main lobes that can distinguish directions, and directions of main lobes between different multi-modal beam patterns do not overlap. For example, the directions of main lobes between different multi-modal beam patterns, $B_0^{(S)}$ to $B_3^{(S)}$ shown in FIG. 4B, do not overlap.

Next, in step S804, a processor 14 of the user equipment 10 controls a transceiver 12 to scan the synchronization signals via an antenna 16, determines a synchronization signal with the strongest received power and a receive beam direction corresponding thereto, and transmits, through a random access channel, an initial access message including index information indicating the synchronization signal with the strongest received power. The processor 14 compares, for example, an average received power of each synchronization signal to confirm the synchronization signal with the strongest average received power and a receive beam direction thereof, and imports, into the initial access message, the index information indicating the synchronization signal with the strongest average received power for transmission to the base station 20 via the random access channel.

Then, in step S806, a processor 24 of the base station 20 controls the transceiver 22 to receive, using the antenna 26, the initial access message by using the plurality of single-modal beam patterns on the random access channel. Coverage of main lobes of the single-modal beam patterns includes only at most one of main lobes of each multi-modal beam pattern. For example, the single-modal beam patterns used on the random access channel are $B_0^{(R)}$ to $B_3^{(R)}$ shown in FIG. 6B. Coverage of $B_1^{(R)}$ includes only a main lobe $D_4$ of the multi-modal beam pattern $B_0^{(S)}$, a main lobe $D_5$ of the multi-modal beam pattern $B_1^{(S)}$, a main lobe $D_6$ of the multi-modal beam pattern $B_2^{(S)}$, and a main lobe $D_7$ of the multi-modal beam pattern $B_3^{(S)}$.

Finally, in step S808, the base station 20 determines a single-modal beam pattern having the strongest access power for the initial access message, and compares the determined single-modal beam pattern having the strongest access power with a main lobe of the multi-modal beam pattern corresponding to the index information, indicating the synchronization signal having the strongest received power, in the initial access message, thereby determining an optimal beam direction for the transmission to the user equipment 10.

For example, if the single-modal beam pattern that has the strongest access power for the initial access message and that is determined by the base station 20 is a beam pattern $B_3^{(R)}$, coverage of the main lobes thereof includes $D_{12}$ to $D_{15}$. An index in the initial access message corresponds to the multi-modal beam pattern $B_1^{(S)}$, main lobes thereof including $D_1$, $D_5$, $D_9$, and $D_{13}$. After an intersection set of the two is obtained, an overlapping main lobe $D_{13}$ can be obtained. Therefore, the base station 20 of the present embodiment may determine that an optimal beam direction for transmitting to the user equipment 10 is $D_{13}$.

Based on the foregoing, with the requirement for the fixed angular domain resolution, according to the beam alignment technology in an initial access stage proposed by the embodiment of the invention, a number of required synchronization signals may be greatly reduced, thereby reducing the search time and radio resource consumption. As shown in Table I, when the resolution requirement is N=64, the number of required synchronization signals may be easily reduced to M=8.

In order to further evaluate efficiency of beam alignment in the initial alignment of the embodiment of the invention, the signal-to-noise ratio (SNR) of an established link, after the beam alignment is achieved in the embodiment of the invention and in the conventional technology, is evaluated by simulation when the number of synchronization signals used is fixed.

Figure 9:
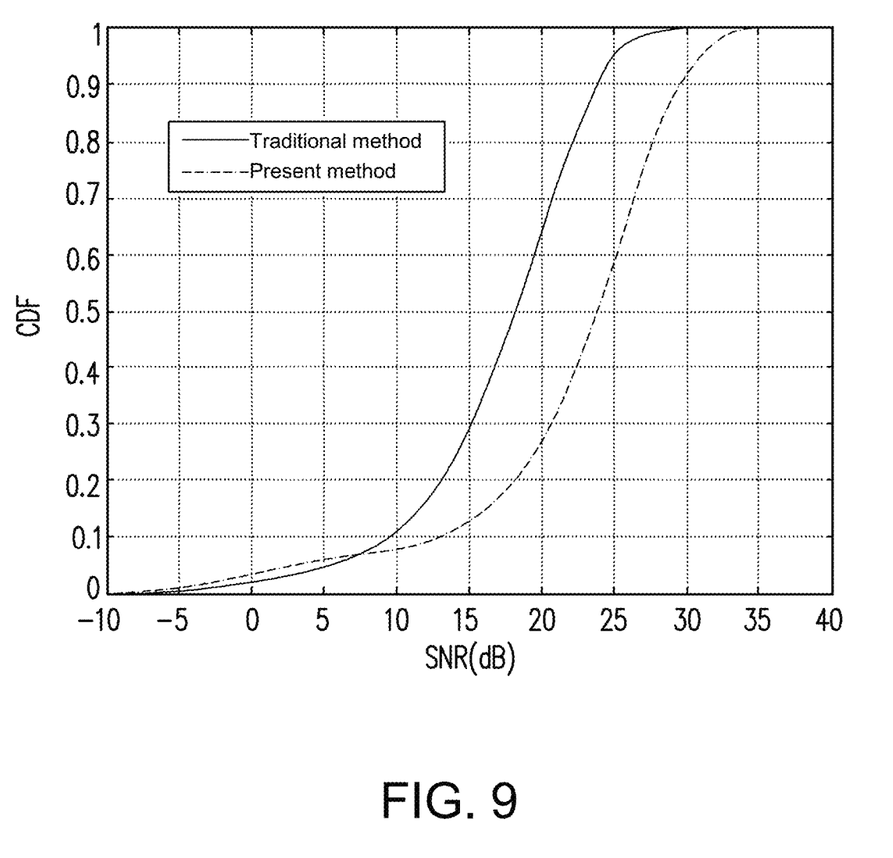
FIG. 9 is a comparison result of the distributions of the established link signal-to-noise ratio for N=16, K=4, and M=4 when both the conventional approach and an embodiment of the invention use the same number of M=4 synchronization signals.

Assuming that the number of the synchronization signals that are used is M, after the beam alignment is achieved through the conventional technology, the angular domain resolution is M. In comparison, the angular domain resolution, after the beam alignment is achieved in the embodiment of the invention, is M×K. Therefore, the angular domain resolution may be significantly improved, further improving the signal-to-noise ratio of the established link. FIG. 9 is a comparison result of link signal-to-noise ratio distribution of N=16, K=4, and M=4 when both the conventional technology and the method of the embodiment of the invention use the same number, M=4, of synchronization signals. The horizontal axis represents the signal-to-noise ratio of the synchronization signal, and the vertical axis represents a cumulative distribution function (CDF) thereof. Assuming that a channel is Rayleigh fading, it can be clearly seen from the figure that better link signal-to-noise ratio can be achieved using the method of the embodiment of the invention, with an overall improvement of more than 5 dB.

Based on the foregoing, in the beam alignment method for the antenna array, the multi-beam transmission system, and the multi-beam transmission apparatus of the embodiment of the invention, a plurality of multi-modal beam patterns is used as beam patterns for transmitting several synchronization signals, and receives an initial access message by using single-modal beam patterns with a lower resolution, so that the optimal beam direction for transmitting to the user equipment is uniquely determined by the single-modal beam pattern with the strongest access power and the multi-modal beam pattern corresponding to the index information recorded in the initial access message. As a result, the beam alignment efficiency and benefits in the initial access stage can be improved.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A beam alignment method for an antenna array, adapted to a multi-beam transmission system including a base station and a user equipment, wherein the method comprises the following steps:
   using, by the base station, a plurality of multi-modal beam patterns as beam patterns for transmitting several synchronization signals, wherein each of the multi-modal beam pattern comprise a plurality of main lobes that can distinguish directions, and directions of the main lobes between the different multi-modal beam patterns do not overlap each other;
   scanning, by the user equipment, the synchronization signals, determining a synchronization signal with the strongest received power and a receive beam direction corresponding to the synchronization signal with the strongest received power, and transmitting, through a random access channel, an initial access message including index information indicating the synchronization signal with the strongest received power;
   receiving, by the base station, the initial access message on the random access channel by using a plurality of single-modal beam patterns, wherein coverage of a main lobe of each of the single-modal beam patterns comprises only at most one of the main lobes of each of the multi-modal beam patterns; and
   determining, by the base station, a single-modal beam pattern with the strongest access power for the initial access message, and comparing the determined single-modal beam pattern having the strongest access power with a main lobe of the multi-modal beam pattern corresponding to the index information, indicating the synchronization signal having the strongest received power, in the initial access message, to determine an optimal beam direction for the transmission to the user equipment.

2. The method according to claim 1, wherein there is a spacing that can distinguish the main lobes between the main lobes of each of the multi-modal beam patterns, and one of the main lobes and one of a plurality of high-resolution single-modal orthogonal beams have the same beam direction.

3. A multi-beam transmission system, comprising:
   a base station using a plurality of multi-modal beam patterns as beam patterns for transmitting several synchronization signals, wherein each of the multi-modal beam patterns comprises a plurality of main lobes that can distinguish directions, and directions of the main lobes between the different multi-modal beam patterns do not overlap each other; and
   a user equipment scanning the synchronization signals, determining a synchronization signal with the strongest received power and a receive beam direction corresponding to the synchronization signal with the strongest received power, and transmitting, through a random access channel, an initial access message including index information indicating the synchronization signal with the strongest received power, wherein
   the base station receives the initial access message on the random access channel by using a plurality of single-modal beam patterns, wherein coverage of a main lobe of each of the single-modal beam patterns comprises only at most one of the main lobes of each of the multi-modal beam patterns; and
   the base station determines a single-modal beam pattern with the strongest access power for the initial access message, and compares the determined single-modal beam pattern having the strongest access power with a main lobe of the multi-modal beam pattern corresponding to the index information, indicating the synchronization signal having the strongest received power, in the initial access message, to determine an optimal beam direction for the transmission to the user equipment.

4. The multi-beam transmission system according to claim 3, wherein the base station comprises a beam that generates the multi-modal beam pattern by using a uniform linear array (ULA) antenna or a uniform planar array (UPA) antenna.

5. The multi-beam transmission system according to claim 3, wherein there is a spacing that can distinguish the main lobes between the main lobes of each of the multi-modal beam patterns, and each of the main lobes and one of a plurality of high-resolution single-modal orthogonal beams have the same beam direction.

6. A multi-beam transmission apparatus, comprising:
   an array antenna;
   a transceiver coupled to the array antenna, and generating, by using the array antenna, beams of a plurality of multi-modal beam patterns and a plurality of single-modal beam patterns, wherein each of the multi-modal beam patterns comprises a plurality of main lobes that can distinguish directions, and directions of the main lobes between the different multi-model beam patterns do not overlap each other; and
   a processor coupled to the transceiver and controlling the transceiver to:
      use the multi-model beam patterns as beam patterns for transmitting several synchronization signals to a user equipment, wherein the user equipment scans the synchronization signals, determines a synchronization signal with the strongest received power and a receive beam direction corresponding to the synchronization signal with the strongest received power, and transmits, through a random access channel, an initial access message including index information indicating the synchronization signal with the strongest received power;
      receive, by using the plurality of single-modal beam patterns on the random access channel, an initial access message transmitted by the user equipment, wherein coverage of a main lobe of each of the single-modal beam patterns comprises only at most one of the main lobes of each of the multi-modal beam patterns; and
      determine a single-modal beam pattern with the strongest access power for the initial access message, and compare the determined single-modal beam pattern having the strongest access power with a main lobe of the multi-modal beam pattern corresponding to the index information, indicating the synchronization signal having the strongest received power, in the initial access message, to determine an optimal beam direction for the transmission to the user equipment.

7. The multi-beam transmission apparatus according to claim 6, wherein the array antenna comprises a uniform linear array (ULA) antenna or a uniform planar array (UPA) antenna.

* * * * *